(12) United States Patent
Singh et al.

(10) Patent No.: US 9,923,934 B2
(45) Date of Patent: Mar. 20, 2018

(54) METHOD AND APPARATUS FOR VOIP COMMUNICATION COMPLETION TO A MOBILE DEVICE

(75) Inventors: Sushant Singh, Fairless Hills, PA (US); Daniel Keil, Highland Park, NJ (US); Mark Loeser, Freehold, NJ (US); Michael South, Jackson, NJ (US); Pasquale Villani, Freehold, NJ (US)

(73) Assignee: Vonage Business Inc., Atlanta, GA (US)

( * ) Notice: Subject to any disclaimer, the term of this patent is extended or adjusted under 35 U.S.C. 154(b) by 408 days.

(21) Appl. No.: 13/190,698

(22) Filed: Jul. 26, 2011

(65) Prior Publication Data
US 2012/0157098 A1    Jun. 21, 2012

Related U.S. Application Data

(60) Provisional application No. 61/367,715, filed on Jul. 26, 2010.

(51) Int. Cl.
*H04L 29/06* (2006.01)

(52) U.S. Cl.
CPC ........ *H04L 65/105* (2013.01); *H04L 65/1069* (2013.01); *H04L 65/1073* (2013.01)

(58) Field of Classification Search
CPC .............................. H04W 60/00; H04W 60/04
(Continued)

(56) References Cited

U.S. PATENT DOCUMENTS

2002/0133601 A1* 9/2002 Kennamer et al. ........... 709/229
2002/0142769 A1* 10/2002 Taylor .................... H04W 28/20
455/426.1

(Continued)

OTHER PUBLICATIONS

Rosenberg, J. et al., SIP: Session Initiation Protocol, Network Working Group, Standards Track, Jun. 2002, pp. 1-269.
A. B. Roach, Session Initiation Protocol (SIP)—Specific Event Notification, Network Working Group, Standards Track, Jun. 2002, pp. 1-38.

*Primary Examiner* — Tammy Paige Goddard
*Assistant Examiner* — Frantz Bataille
(74) *Attorney, Agent, or Firm* — Nixon & Vanderhye, P.C.; Joseph Pagnotta

(57) ABSTRACT

A system and method for establishing a voice over Internet protocol link to a called party's mobile telephony device utilizes push notifications to activate a communications application on the called party's mobile telephony communications device. When a request to establish a voice over Internet protocol link to a mobile device is received by an incoming proxy server of a voice over Internet protocol service provider, the service provider causes a push notification to be sent to the mobile device. The called party can respond to the push notification in a manner that causes a communications application on the mobile device to be activated. Once the push notification has caused the communications application to activate, the communications application sends a special registration request to an outbound proxy server. The special registration request causes the outbound proxy server to initiate messaging that is ultimately delivered to an inbound proxy server, the messaging identifying the outbound proxy server with which the communications application has registered. The inbound proxy server can then communicate with the outbound proxy server to obtain information that allows a voice over Internet protocol link to be established with the called party's mobile telephony device.

22 Claims, 4 Drawing Sheets

(58) Field of Classification Search
USPC .................................................. 455/435.1
See application file for complete search history.

(56) References Cited

U.S. PATENT DOCUMENTS

| | | | |
|---|---|---|---|
| 2004/0199641 A1* | 10/2004 | Bajko ............................ | 709/227 |
| 2004/0243629 A1* | 12/2004 | Nomura et al. ............ | 707/104.1 |
| 2005/0266869 A1* | 12/2005 | Jung ....................... | H04W 4/10 |
| | | | 455/518 |
| 2007/0004382 A1* | 1/2007 | Haukilahti ................. | 455/412.1 |
| 2007/0268863 A1* | 11/2007 | Venkatachalam ............. | 370/331 |
| 2008/0253362 A1* | 10/2008 | Samarasinghe et al. ..... | 370/352 |
| 2009/0106389 A1* | 4/2009 | Hakkarainen et al. ....... | 709/217 |
| 2009/0264144 A1* | 10/2009 | Shigeta ................... | H04M 1/57 |
| | | | 455/518 |
| 2009/0323658 A1* | 12/2009 | Balasubramanian et al. ............................ | 370/338 |

* cited by examiner

METHOD AND APPARATUS FOR VOIP COMMUNICATION COMPLETION TO A MOBILE DEVICE

CROSS-REFERENCES TO RELATED APPLICATIONS

This application claims priority to U.S. Provisional Application Ser. No. 61/367,715, which was filed Jul. 26, 2010, the entire contents of which is hereby incorporated by reference.

BACKGROUND OF THE INVENTION

The invention relates to voice over Internet protocol (VOIP) communications, and more specifically to methods and apparatus used to establish a VOIP communications session with a mobile device.

Many mobile communications and computing devices are now configured to load and run application programs that can provide virtually any sort of functionality. And because many of these mobile communications and computing devices are able to establish a link to the Internet, either via a wireless router or via a data channel of a cellular data network, it is possible for an application running on a mobile device to communicate via the Internet. Examples of such mobile communications and computing devices include the Apple iPhone™ and various mobile phones that utilize the Android™ operating system.

Various service providers have created communications applications that can be loaded and run on a mobile communications device such as the Apple iPhone™. Some communications applications provide functionality that allows a VOIP service provider to establish a VOIP communications channel with a mobile communications device via an Internet connection or a cellular data connection that is maintained by the mobile communications device. When a mobile communications device is running one of these communications applications, it is possible for a VOIP service provider to establish a VOIP telephone call between the mobile communications device and a third party.

Many mobile communications devices are configured to run only one or two applications simultaneously. And this fact can be problematic if one is attempting to establish a VOIP communications channel with a mobile communications device. If the communications application that provides the functionality for establishing a VOIP communications channel is not actually running on a mobile device, it is not possible to setup a new VOIP communications channel with the mobile device.

Many users are willing to download and install a service provider's communications application. However, once the communications application is installed, it is not usually running on the user's mobile device. Most of the time, either some other application is running, or no applications are actively running.

Because of these facts, when a calling party attempts to establish a VOIP telephone call to a called party's mobile communications device via a VOIP service provider, it is usually impossible for the VOIP service provider to complete the telephone call to the called party's mobile device. As noted, because the communications application is usually not running on the mobile device, the service provider cannot establish a new VOIP telephone call to the called party's mobile device.

Even when an application is actively running on a mobile device, it may be advantageous to delegate reception of incoming communications attempts to a general-purpose notification service. For example, a VOIP application installed on a mobile device may use industry standard SIP protocol, via UDP transport, to establish and maintain telephone calls. However, keeping a communications path constantly open for incoming calls requires frequent exchanges of information between the VOIP service provider and the mobile device. And such frequent communications can unacceptably reduce battery life.

While there are techniques to reduce the frequency of information exchanges, such as using the TCP transport method rather than UDP, these techniques also have drawbacks. The communications protocol is less well-adopted in the industry, and/or it may be more prone to lost calls whenever the mobile device switches connection methods or is otherwise assigned a new IP address.

By using a general-purpose notification service, the VOIP application installed on a mobile device can benefit from a common channel. For example, this may permit the VOIP application to use a high-quality WiFi connection for voice, while allowing it to turn off the WiFi radio except when a call is actually in progress.

DETAILED DESCRIPTION OF THE INVENTION

Figure 1:
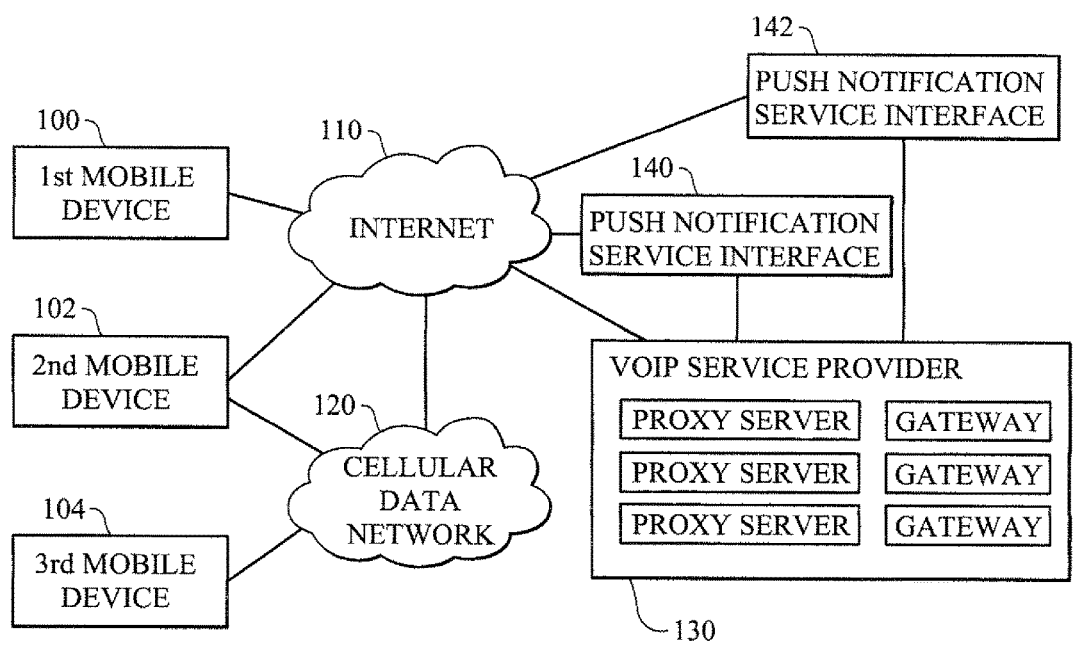
FIG. 1 is a diagram illustrating elements of a system that interconnects user mobile devices with a push notification service and a VOIP service provider.

Systems and methods for establishing a VOIP communications channel with a mobile communications device are described in connection with FIGS. 1-4. These systems and methods make it possible to establish a VOIP communications channel with a mobile communications device even when the mobile device is not already running a communications application from a VOIP service provider.

The systems and methods described herein make use of a push notification service that sends messages to mobile communications devices. For example, Apple provides the Apple Push Notification Service (APNS), which is presently designed to send messages to at least the Apple iPhone™, the Apple iPad™ and the Apple iTouch™ devices. The push notifications are rigidly formatted messages that can be received by such devices anytime they are running and connected to either the Internet or a cellular data network.

Although the following description uses the APNS as an example, use of the APNS is not required, nor should this example be considered limiting. Other push notification services that have different message formats and different capabilities could also be used.

Also, in the examples that follow, the signaling between various elements used to establish a VOIP communications channel with a mobile device generally follows the Session Initiation Protocol (SIP) format. Session Initiation Protocol (SIP) is a signaling protocol for initiating, managing and terminating media (e.g., voice, data and video) sessions across packet based networks that typically use the Internet Protocol (IP), of which VOIP is an example. The details and functionality of SIP can be found in the Internet Engineering Task Force (IETF) Request for Comments (RFC) Paper No. 3261 entitled, "SIP: Session Initiation Protocol" herein incorporated in its entirety by reference. SIP establishes and negotiates a session, including the modification or termination of a session. It uses a location-independent address system feature in which called parties can be reached based on a party's name. SIP supports name mapping and redirection, allowing users to initiate and receive communications from any location. As such, it presents part of a solution to the problem of establishing a communications channel with a mobile telephony device, as described below.

Systems and methods of establishing a VOIP communications channel with a mobile device could also use signaling formats other than SIP. Thus, the description of typical SIP signaling should not be considered limiting.

The Apple Push Notification Service allows an application that is installed on an Apple device such as the Apple iPhone™ to complete a registration process that results in the application receiving a device token. The device token uniquely identifies the mobile device itself. The application on the mobile device then provides this token to the service provider that created the application on the mobile device.

Once the service provider has possession of the token associated with a mobile device, the service provider can cause the APNS to send push notifications to the mobile device. A request for a push notification that is sent from the service provider to the APNS would include the device token, and information about the type of push notification that is to be sent to the mobile device.

When the APNS receives a push notification request from a service provider, it uses the information in the request to create a formatted push notification that it then delivers to the mobile device. The push notification can cause the mobile device to take several different actions. For example, a push notification can cause the mobile device to update a number displayed on a badge associated with the service provider's application. The number usually indicates that new information is available to the application, and the number may indicate the quantity of the new information. When a user sees a number on an application badge, the user can press the badge to load and run the application, which usually results in the application requesting and obtaining the new information that is waiting.

A push notification can also cause a notification message to be displayed on the mobile device. The notification message will usually include two buttons that the user can press. One button, usually labeled as "DISMISS," allows the user to dismiss the notification message. If the user presses this button, the notification message will no longer be displayed, and no further action will be taken by the mobile device.

However, if the user pushes the other button, which is usually labeled as "VIEW," the mobile device will load and run the application on the mobile device that is associated with the service provider that caused the push notification to be sent.

In other configurations, when a push notification is received by a mobile device, the mobile device simply automatically loads and runs a particular application associated with the push notification, without waiting for user intervention.

As explained above, a push notification message is typically associated with a particular application that is resident on a mobile device. In some instances, the application may already be running on the mobile device when a push notification message associated with the application is received. In this situation, the push notification message is passed along to the application, either automatically, or only after the user grants permission for the message to be passed along.

When a service provider requests that a notification message be sent to a mobile device, the service provider can specify the text that is presented to the user as part of the notification message displayed on the mobile device. The wording to be displayed is part of the push notification request that is sent from the service provider to the APNS. And the APNS uses this information to format the push notification that is then delivered to the mobile device.

The following description provides for integration of a push notification service and VOIP system architecture to help establish a VOIP communications channel with a mobile device. FIG. 1 illustrates the general architecture of systems that communicate with mobile devices. As shown therein, first, second and third mobile devices 100, 102, 104 are part of the architecture. The mobile devices can be any mobile communications and computing devices that are capable of loading and running a communications application that allows a mobile device to establish a VOIP communications channel. The first mobile device 100 has a data connection to the Internet 110. This data connection could be a wired or wireless connection to the Internet. For example, the first mobile device could establish a wireless connection to the Internet 110 via a wireless router. The second mobile device 102 has a direct connection to the Internet 110, and a connection to a cellular data network 120 via a cellular link. The direct connection to the Internet 110 could be via wired or wireless means. The connection to the cellular data network 120 would typically be established via a cellular transceiver in the second mobile device 102. The third mobile device 104 has only a connection to the cellular data network 120, which would typically be established via a cellular transceiver in the third mobile device 104. However, the cellular data link is used to access the Internet 110.

The architecture also includes two push notification service interfaces 140 and 142. The push notification service interfaces could be two separate instantiations of the Apple Push Notification Service that are maintained on separate hardware located in different locations. Alternatively, the push notification service interfaces could be some other type of push notification service designed to send push notifications to other types of mobile devices.

The push notification service interfaces 140, 142 are both coupled to the Internet 110, which allows the push notification service interfaces to send push notifications to the mobile devices 100, 102, 104. The push notifications could be sent to the first and second mobile devices 100, 102 via the Internet 100. The push notifications could also be sent to the second and third mobile devices 102, 104 via a path that includes the Internet 110 and the cellular data network 120.

The architecture further includes a VOIP service provider 130. The VOIP service provider maintains and controls multiple proxy servers and multiple gateways, as is well known to those of ordinary skill in the VOIP telephony arts.

The VOIP service provider 130 can create a communications application that is loaded onto the mobile devices 100, 102, 104. As described above, a communications application on a mobile device can complete a registration process that results in a device token being issued to the communications application. And the communications application can then send a copy of the device token to the VOIP service provider 130. The VOIP service provider then uses this device token in communications with the push notification service interfaces 140, 142 to request that push notifications be sent to the mobile device.

A method of establishing a VOIP communications channel to a mobile device that has loaded a communications application from a VOIP service provider will now be described in conjunction with the diagram in FIG. 2. This method assumes that: (1) the communications application on the mobile device has already obtained a device token and forwarded that device token to the VOIP service provider; and (2) that the communications application is not already running on the mobile device.

The method is initiated when a calling party 200 seeks to establish a VOIP telephone call to the called party's mobile device 240. This could occur when the calling party dials the called party's telephone number. However, this could also occur under a variety of other circumstances. For example, the calling party might be using a communications application on his own mobile device, and the calling party might utilize the communications application to request that a VOIP telephone call be placed to the called party.

For purposes of the following explanation, the way in which the call is initiated is not important. All that matters is that the calling party is seeking to establish a VOIP telephone call to the called party's mobile device via a VOIP service provider.

The VOIP service provider would, in some fashion, control and/or interact with multiple proxy servers 210, 230, 232 and 234. A first proxy server 210 will be referred to as the inbound proxy server because the request to establish a VOIP telephone call to the called party's mobile device 240 is first received at this proxy server. The other proxy servers 230, 232, 234 illustrated in FIG. 2 will be referred to as outbound proxy servers because these proxy servers are the ones capable of making contact with and registering the called party's mobile device 240.

Figure 2:
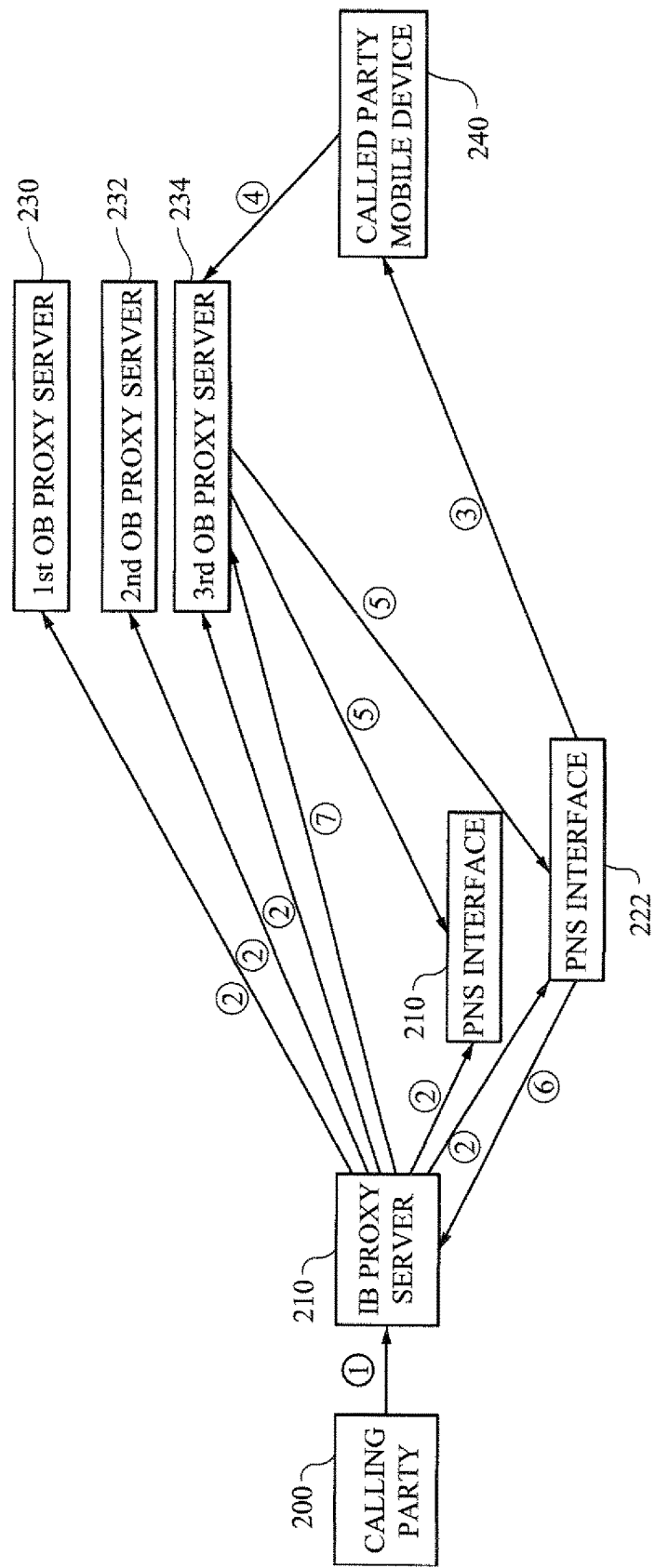
FIG. 2 is a diagram illustrating the message signaling that occurs when a new VOIP telephone call is established between a calling party and a called party's mobile communications device.

FIG. 2 also illustrates multiple push notification service interfaces 220, 222. As explained above, these push notification service interfaces 220, 222 are capable of sending push notifications to the called party's mobile device 240 in response to requests from service providers. Each push notification service interface could be a separate instantiation of the push notification service running on a separate set of hardware, where different instantiations are at different physical locations. In many instances, the push notification service interfaces will be operated by an entity other than the VOIP service provider.

The method begins when the calling party 200 sends a request to establish a VOIP telephone call to the called party's mobile device 240. This request would be received by the inbound proxy server 210. This request corresponds to the arrow labeled with reference number 1.

In accordance with SIP signaling in one embodiment of the invention, the inbound proxy server 210 sends an INVITE message to all outbound proxy servers 230, 232, 234 associated with the called party's mobile device, as indicated by the arrows labeled with reference number 2. However, because the communications application on the called party's mobile device 240 is not running, the called party's mobile device will not be registered with any of the outbound proxy servers 230, 232, 234. For this reason, each of the outbound proxy servers 230, 232, 234 will send a message back to the inbound proxy server 210 indicating that the called party cannot be found.

At the same time the inbound proxy server 210 sends INVITE messages to the outbound proxy servers 230, 232, 234, the inbound proxy server 210 will also send a request to the push notification service interfaces 220, 222 associated with the called party's mobile device to request that a push notification be sent to the called party's mobile device. In FIG. 2, the architecture includes a first push notification service interface 220 and a second push notification service interface 222. The request may include information identifying the calling party by name, telephone number, or via other identifying means. In some instances, the request that a push notification be sent may take the same form as the SIP INVITE message sent to the outbound proxy servers. The requests sent to the push notification service interfaces 220, 222 are also indicated by arrows labeled with reference number 2.

In some embodiments, there may be a limit on the number and identity of the push notification service interfaces that are associated with a particular mobile device. In other embodiments, any number of push notification service interfaces may be associated with a mobile device.

In FIG. 2, the second push notification service interface 222 is linked to the called party's mobile device 240. When the second push notification service interface 222 receives the request to send a push notification, it generates and forwards a suitable push notification to the called party's mobile device 240. This signaling is represented with the arrow identified with reference number 3.

In an alternate embodiment, the inbound proxy server 210 may not send the INVITE messages to the push notification service interfaces 220, 222 until after it has received messages back from all of the outbound proxy servers 230, 232, 234 indicating that none of the outbound proxy servers are in communication with the called party's mobile device 240. This would prevent a push notification from being sent to the called party's mobile device 240 in those situations where the called party's mobile device is already registered with and in communication with one of the outbound proxy servers.

Also, the inbound proxy server might send an INVITE message to only one push notification service interface associated with the called mobile device. Thereafter, the inbound proxy server would only send an INVITE message to a second push notification service interface if the first push notification service interface failed to respond.

In still other embodiments, the inbound proxy server might send INVITE messages to multiple push notification service interfaces that are associated with the called mobile device. In this instance, the various push notification service interfaces could coordinate among themselves to ensure that only one push notification is sent to the mobile device. Alternatively, all push notification service interfaces that receive an INVITE message might send a push notification to the mobile device.

When the called party's mobile device 240 receives the push notification, it will display a message to the called party that indicates there is an incoming telephone call. The message may include DISMISS and VIEW buttons that can be activated by the called party.

The notification message that is displayed to the called party by the mobile device can take many different forms. In some instances, it may merely indicate that there is an incoming telephone call. The called party would then hit the view key to receive the incoming telephone call.

In other instances, the notification message may provide an indication regarding the identity of the calling party. This information would be provided by the inbound proxy server 210 as part of the request for a push notification. The push notification service interface 222 would use the information provided by the inbound proxy server 210 to format a push notification that will cause the relevant information to appear on the called party's mobile device 240.

If the called party does not wish to answer the call, the called party can hit the DISMISS key, and the message will not longer be displayed and no further action will be taken by the mobile device. As a result, the calling party will ultimately be unsuccessful in establishing a VOIP telephone call with the called party.

On the other hand, if the called party selects the "VIEW" key, the mobile device will activate the communications application associated with the VOIP service provider who requested that the push notification be sent. Of course, in alternate embodiments, when a push notification is received by a mobile device, the mobile device may simply automatically activate the communications application without waiting for user input.

When the communications application is activated, the communications application may receive some of the information contained within the push notification. For example, the information may include the fact that the communications application has been activated in response to a push notification. The information may also include the identity of the push notification service interface that sent the push notification. Further, information about the incoming call, such as the telephone number or identity of the calling party, may be provided to the communications application. The communications application then contacts one of the outbound proxy servers to register itself. FIG. 2 shows the called party's mobile device 240 contacting the third outbound proxy server 234. This signaling is represented by the arrow identified with reference number 4.

The registration request sent from the called party's mobile device 240 to the third outbound proxy server 234 may be a typical SIP REGISTER message, followed by a special SIP NOTIFY message. When the third outbound proxy server 234 receives these messages from the called party's mobile device 240, it will send a message to one or all of the push notification service interfaces 220, 222 associated with the called party's mobile device. It is the NOTIFY message which causes this to occur. In alternate embodiments, some other type of signaling or a special type of registration request may trigger the outbound proxy server 234 to send such a message to one or more of the push notification service interfaces 220, 222. This messaging is represented by the arrows identified with reference number 5 in FIG. 2.

The initial registration request sent from the communications application to the outbound proxy server may include information about which push notification service interface originally sent the push notification to the mobile device. In alternate embodiments, information exchanged between the mobile device and the outbound proxy server after the initial registration request may include this information. When provided, it would allow the outbound proxy server to send a message directly to the push notification service interface that sent the push notification to the mobile device.

The communications application resident on the called party's mobile device 240 may be configured to act differently depending on how the application is activated. If a user activates the application by simply issuing a request to run the communications application, the communications application may send a first type of registration request to an outbound proxy server. And this first type of registration request would not trigger the outbound proxy server to send a message to the push notification service interfaces.

However, the communications application may also be configured such that when the communications application is activated in response to a push notification message, the communications application sends a second type of registration request to an outbound proxy server. And this second type of registration request will cause the outbound proxy server receiving the second type of registration request to send a message to the push notification service interfaces associated with the called party's mobile device.

In still other embodiments, each time that the communications application is activated, regardless of how the activation occurs, the registration request sent from the mobile device will cause the outbound proxy server to send a message to the push notification service interfaces associated with the mobile device.

The form of the message sent from the outbound proxy server 234 to the push notification service interfaces 220, 222 can vary. However, the message will cause the push notification service interface that originally sent the push notification to send a message back to the inbound proxy server 210 with information identifying the outbound proxy server 234. The message sent from the push notification service interface 222 to the inbound proxy server 210 is identified with reference number 6 in FIG. 2.

In some instances, the message sent from the push notification service interface 222 to the inbound proxy server 210 may take the form of a SIP 302 redirect message. That message would instruct the inbound proxy server 210 to contact the outbound proxy server 234 to obtain information that allows a VOIP telephone call to be placed to the called party's mobile device. In other instances, the message sent from the push notification service interface 222 to the inbound proxy server 210 may take other forms. Regardless, the message will inform the inbound proxy server that it can contact the outbound proxy server 234 to proceed with establishing a VOIP telephone call to the called party's mobile device 240.

The inbound proxy server 210 would then contact the outbound proxy server 234 to obtain the information needed to establish a VOIP telephone call to the called party's mobile device. In some instances, this would involve the inbound proxy server 210 sending a typical SIP INVITE message to the outbound proxy server 234. This signaling is represented by the arrow identified with reference number 7 in FIG. 2. From this point on, the VOIP telephone call setup would proceed normally.

With the method described above, when an incoming call directed to a called party's mobile device is received by a VOIP service provider, it is possible to cause a communications application resident on a called party's mobile device to activate and register itself with a proxy server. It is also possible to generate signaling that informs the inbound proxy server of the identity of the outbound proxy server with which the called party's mobile device registered. Thus, it is possible to complete a VOIP telephone call to the called party's mobile device, even through the communications application on the called party's mobile device was not active when the incoming call setup request was received.

Figure 3:
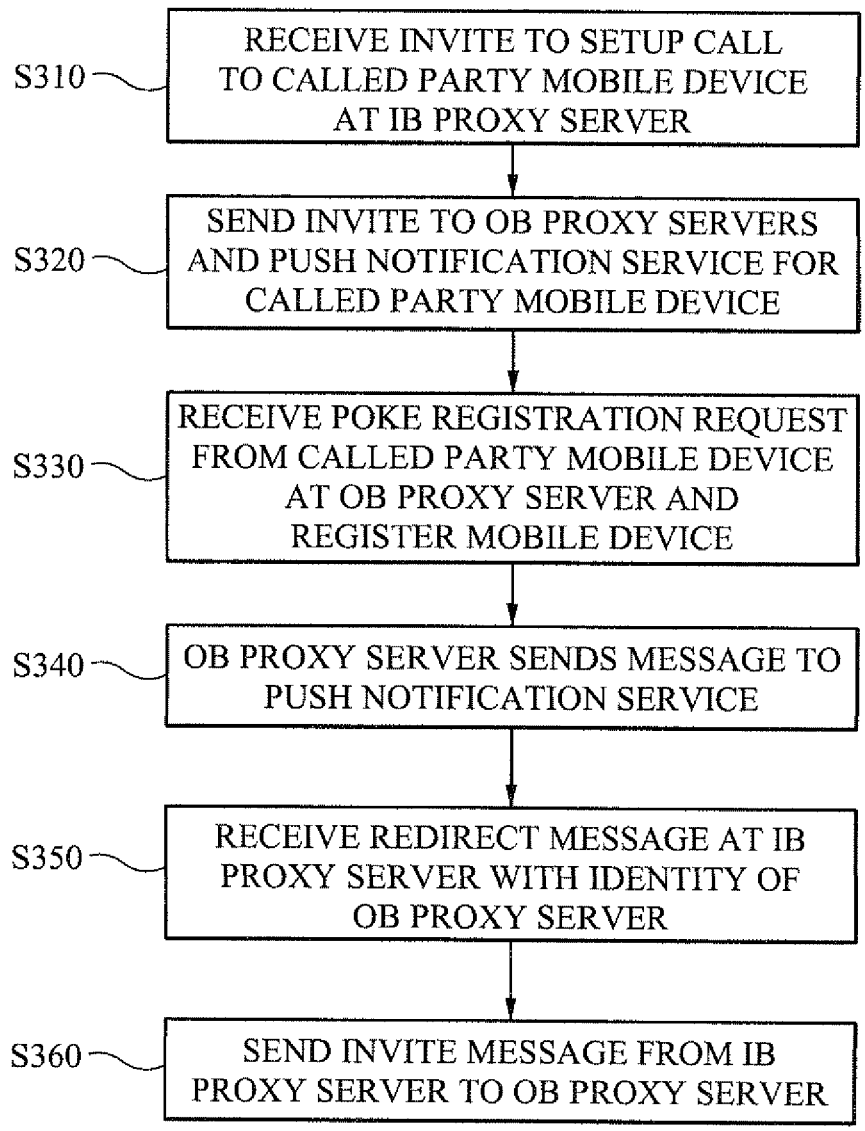
FIG. 3 is a diagram illustrating steps of a method that is performed by elements of a voice over Internet protocol service provider to establish a VOIP telephone call between a calling party and a called party's mobile communications device.

FIG. 3 illustrates steps of a method that can be performed by elements under the control of a VOIP service provider to connect an incoming VOIP telephone call to a mobile device that is not already running a communications application provided by the VOIP service provider. The steps of this method correspond to some of the steps of the method described above in connection with FIG. 2.

The method begins in step S310, where a VOIP service provider receives a call setup request from a calling party. The call setup request indicates that a calling party wishes to establish a VOIP telephone call with a called party's mobile device. This request is received at an inbound proxy server controlled by or otherwise used by the VOIP service provider.

In step S320, the inbound proxy server sends an INVITE message to all the outbound proxy servers associated with the called party's mobile device. In addition, the inbound proxy server sends a message to all push notification service interfaces associated with the called party's mobile device to request that a push notification be sent to the called party's mobile device. As explained above, the message sent to the push notification service interfaces could include information that identifies the calling party in some fashion. This message could also include text for the message to be displayed on the called party's mobile device as part of the push notification. Further, this message could include a device token associated with the called party's mobile device.

Although it is not a part of this method, as explained above, the push notification service interface would then send an appropriate push notification to the called party's mobile device. If the called party selects the "VIEW" option in response to the push notification, the communications application on the called party's mobile device would be activated. The communication application would then generate a registration request that is sent to one of the outbound proxy servers operated or used by the VOIP service provider.

The method illustrated in FIG. 2 would then continue in step S330, when an outbound proxy server receives a registration request from the called party's mobile device. The outbound proxy server then registers the called party's mobile device.

In step S340, the outbound proxy server sends a message to all push notification service interfaces associated with the called party's mobile device.

Although not a part of the method illustrated in FIG. 3, the message sent from the outbound proxy server to the push notification service interfaces would cause the push notification service interface that sent the original push notification to the called party's mobile device to send a redirect message to the inbound proxy server that sent the original request for a push notification. The redirect message would inform the inbound proxy server of the identity of the outbound proxy server that has just registered the called party's mobile device.

The method would continue in step S350, when the inbound proxy server receives the redirect message from the push notification service interface. Then, in step S360, the inbound proxy server sends an INVITE message to the outbound proxy server. From here, the VOIP call would be established between the calling party and the called party's mobile device using standard signaling and procedures.

The forgoing description made reference to certain standard SIP messaging. In alternate embodiments, different types of messaging could be used to establish a VOIP telephone call between a calling party and a called party's mobile device. SIP signaling is merely one way in which it could occur.

Figure 4:
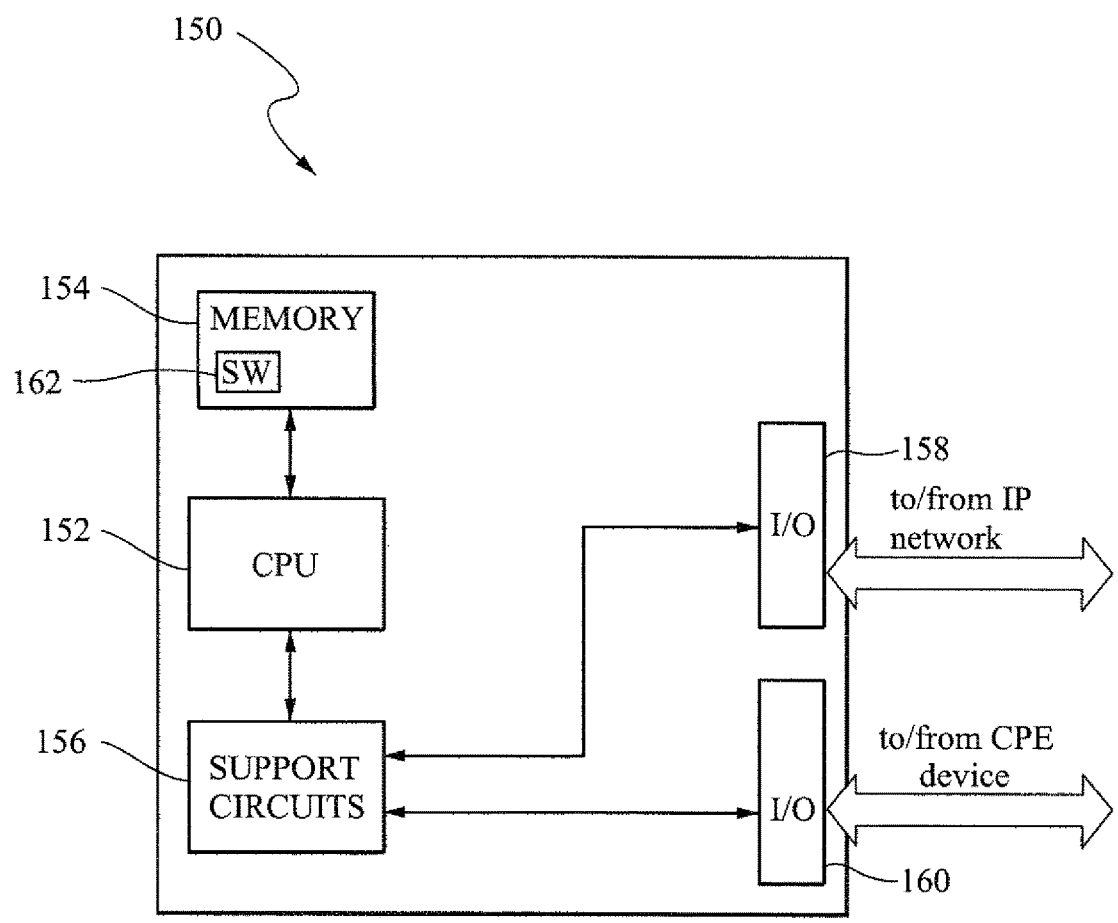
FIG. 4 is a diagram of various elements of a processor which can be part of a VOIP telephony system.

FIG. 4 illustrates elements of a computer processor that can be used as part of the VOIP telephony service to accomplish various functions associated with the present invention. The VOIP telephony service could include multiple processors 150 located at various locations in the system, along with their operating components and programming, each carrying out a specific or dedicated portion of the functions performed by the VOIP based telephony service.

The processor 150 shown in FIG. 4 may be one of any form of a general purpose computer processor used in accessing an IP-based network, such as a corporate intranet, the Internet or the like. The processor 150 comprises a central processing unit (CPU) 152, a memory 154, and support circuits 156 for the CPU 152. The processor 150 also includes provisions 158/160 for connecting the processor 150 to customer equipment and to service provider agent equipment, as well as possibly one or more input/output devices (not shown) for accessing the processor and/or performing ancillary or administrative functions related thereto. The provisions 158/160 are shown as separate bus structures in FIG. 2; however, they may alternately be a single bus structure without degrading or otherwise changing the intended operability of the processor 150.

The memory 154 is coupled to the CPU 152. The memory 154, or computer-readable medium, may be one or more of readily available memory such as random access memory (RAM), read only memory (ROM), floppy disk, hard disk, flash memory or any other form of digital storage, including but not limited to non-volatile memory, local or remote. The support circuits 156 are coupled to the CPU 152 for supporting the processor in a conventional manner. These circuits include cache, power supplies, clock circuits, input/output circuitry and subsystems, and the like.

A software routine 162, when executed by the CPU 152, causes the processor 150 to perform processes of the disclosed embodiments, and is generally stored in the memory 154. The software routine 162 may also be stored and/or executed by a second CPU (not shown) that is remotely located from the hardware being controlled by the CPU 152. Also, the software routines could also be stored remotely from the CPU. For example, the software could be resident on servers and memory devices that are located remotely from the CPU, but which are accessible to the CPU via a data network connection.

The software routine 162, when executed by the CPU 152, transforms the general purpose computer into a specific purpose computer that performs one or more functions of the VOIP telephony service 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 162 of the disclosed embodiments is capable of being executed on any computer operating system, and is capable of being performed using any CPU architecture.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of establishing a telephony link between a calling party and a called party's mobile device, comprising:

receiving, at a first proxy server, a request from a calling party to establish a telephony link to a called party's mobile device;

sending, to a third party server, a request that a first message be sent to the called party's mobile device;

receiving, at a second proxy server, an Internet Protocol (IP) telephony system registration request from a non-native software application on the called party's mobile device that was caused to run in response to receipt of a push notification sent by the third party server to the called party's mobile device;

causing a second message identifying the second proxy server to be delivered to the first proxy server; and establishing a telephony link between the calling party and the called party's mobile device using information passing between the first and second proxy servers.

2. The method of claim 1, wherein the causing step comprises sending, to the third party server, a message that causes the third party server to send a message to the first proxy server identifying the second proxy server.

3. The method of claim 1, wherein the causing step comprises the second proxy server sending a message to multiple third party servers that cause at least one of the third party servers to send a message to the first proxy server identifying the second proxy server.

4. The method of claim 1, wherein the request that a first message be sent to the called party's mobile device includes information identifying the calling party.

5. The method of claim 4, wherein the information identifying the calling party includes the calling party's name.

6. The method of claim 4, wherein the information identifying the calling party includes a telephone number associated with the calling party.

7. The method of claim 1, wherein the IP telephony system registration request received by the second proxy server from the called party's mobile device is a special IP telephony system registration request that is generated by the software application when the software application is activated in response to receipt of the first message by the called party's mobile device.

8. The method of claim 1, wherein the step of sending, to the third party server, a request that a first message be sent to the called party's mobile device comprises sending messages requesting that a first message be sent to the called party's mobile device to multiple third party servers that are associated with the called party's mobile device.

9. The method of claim 1, wherein the causing step comprising causing a third party server to send a SIP redirect message identifying the second proxy server to the first proxy server.

10. The method of claim 1, wherein the third party server comprises a server that provides a push notification service.

11. The method of claim 10, wherein the request that a first message be sent to the called party's mobile device comprises a request that the push notification be sent to the called party's mobile device.

12. A system for establishing a telephony link between a calling party and a called party's mobile device, comprising:
a first proxy server, wherein when the first proxy server receives a request from a calling party to establish a telephony link to a called party's mobile device, the first proxy server sends a request to a third party server asking that a first message be sent to the called party's mobile device; and
a second proxy server, wherein when the second proxy server receives an Internet Protocol (IP) telephony system registration request from a non-native software application on the called party's mobile device that was caused to run in response to receipt of a push notification sent by a push notification service to the called party's mobile device, the second proxy server causes a message identifying the second proxy server to be sent to the first proxy server.

13. The system of claim 12, wherein the second proxy server only causes a message identifying the second proxy server to be sent to the first proxy server if the IP telephony system registration request is a special IP telephony system registration request.

14. The system of claim 13, wherein the special IP telephony system registration request is an IP telephony system registration request that is generated by the software application on the called party's mobile device when the software application is activated in response to the first message sent from the third party server.

15. The system of claim 12, wherein when the first proxy server receives a request from a calling party to establish a telephony link to a called party's mobile device, the first proxy server sends a request to multiple third party servers associated with the mobile device requesting that a first message be sent to the called party's mobile device.

16. The system of claim 12, wherein when the second proxy server receives the IP telephony system registration request from the called party's mobile device, the second proxy server sends a message to multiple third party servers associated with the mobile device.

17. The system of claim 12, wherein the request sent from first proxy server to a third party server includes information identifying the calling party.

18. The system of claim 12, wherein the request sent from the first proxy server to third party server includes information identifying the called party's mobile device.

19. The system of claim 18, wherein the information identifying the called party's mobile device comprises a device token that was provided by the software application that is resident on the called party's mobile device.

20. The system of claim 12, wherein when the first proxy server receives the request from the calling party to establish the telephony link to the called party's mobile device, the first proxy server sends a request to the push notification service asking that the push notification be sent to the called party's mobile device.

21. A non-transitory computer readable medium having instructions stored thereon, which when executed cause one or more computers to perform a method comprising:
receiving, at a first proxy server, a request from a calling party to establish a telephony link to a called party's mobile device;
sending, to a third party server, a request that a first message be sent to the called party's mobile device;
receiving, at a second proxy server, an Internet Protocol (IP) telephony system registration request from a non-native software application on the called party's mobile device that was caused to run in response to receipt of a push notification sent by the third party server to the called party's mobile device;
causing a second message identifying the second proxy server to be delivered to the first proxy server; and
establishing a telephony link between the calling party and the called party's mobile device using information passing between the first and second proxy servers.

22. The method of claim 1, wherein the second message identifying the second proxy server is transmitted from the third party server.

* * * * *